No. 716,973. Patented Dec. 30, 1902.
G. X. WITTMER.
RECORDING APPARATUS FOR FLUID METERS.
(Application filed Mar. 8, 1902.)

(No Model.) 2 Sheets—Sheet 1.

WITNESSES:
C. L. Belcher
Birney Hines

INVENTOR
George X. Wittmer
BY
Harley J. Carr
ATTORNEY

No. 716,973. Patented Dec. 30, 1902.
G. X. WITTMER.
RECORDING APPARATUS FOR FLUID METERS.
(Application filed Mar. 8, 1902.)

(No Model.) 2 Sheets—Sheet 2.

WITNESSES:
C. L. Belcher
Birney Hines

INVENTOR
George X. Wittmer
BY
Whiley E. Carr
ATTORNEY

UNITED STATES PATENT OFFICE.

GEORGE X. WITTMER, OF PITTSBURG, PENNSYLVANIA, ASSIGNOR TO PITTSBURG METER COMPANY, A CORPORATION OF PENNSYLVANIA.

RECORDING APPARATUS FOR FLUID-METERS.

SPECIFICATION forming part of Letters Patent No. 716,973, dated December 30, 1902.

Application filed March 8, 1902. Serial No. 97,347. (No model.)

*To all whom it may concern:*

Be it known that I, GEORGE X. WITTMER, a citizen of the United States, residing at Pittsburg, in the county of Allegheny and State of Pennsylvania, have invented a new and useful Improvement in Recording Apparatus for Fluid-Meters, (Case No. 1,040,) of which the following is a specification.

My invention relates to fluid-meters, and particularly to recording apparatus therefor; and it has for one of its objects to provide means for recording both the pressure and the volume of the fluid flowing through the meter at each instant of time during the operation.

A further object of the invention is to provide a scale or chart having a series of multipliers the products of which by the corresponding fluid-pressures as recorded on the scale or chart shall equal the volumes of fluid at a given constant pressure.

My invention is illustrated in the accompanying drawings as applied to a gas-meter, and for convenience it will be so described. The invention is not to be construed, however, as limited in its application to any specific type of meter or to the measurement of gas as distinguished from other fluids.

Figure 1:
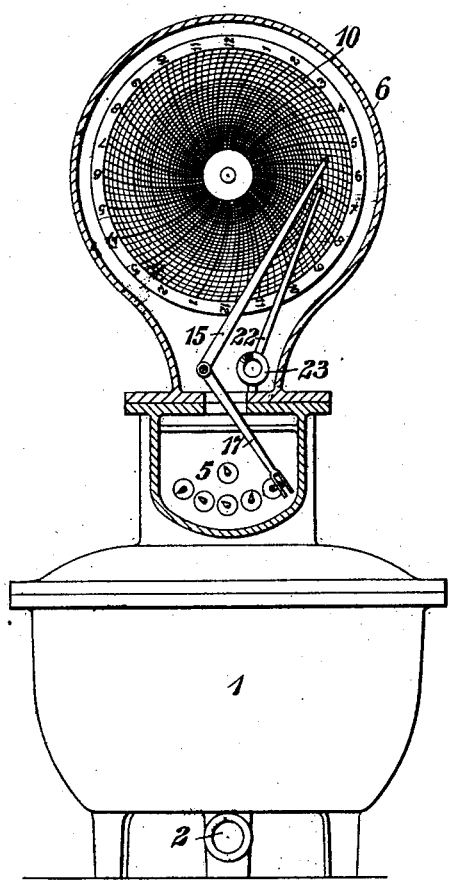
Figure 2:
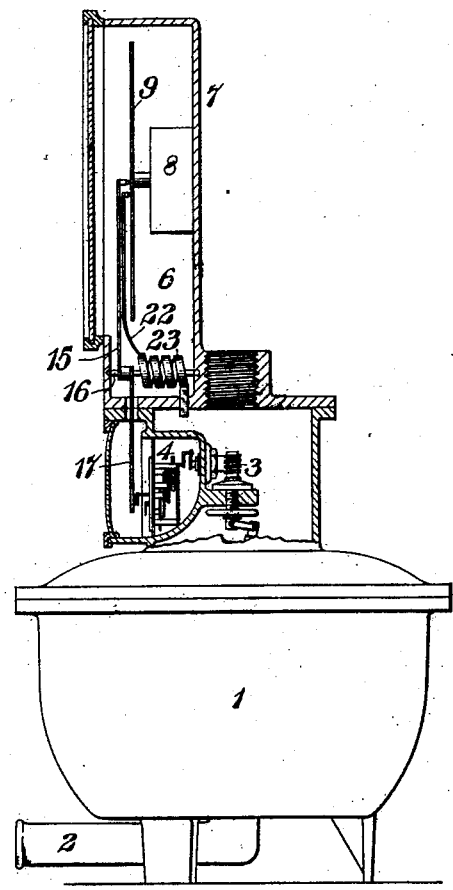
Figure 3:
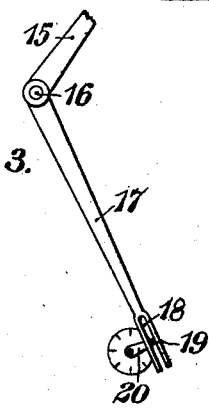
Figure 4:
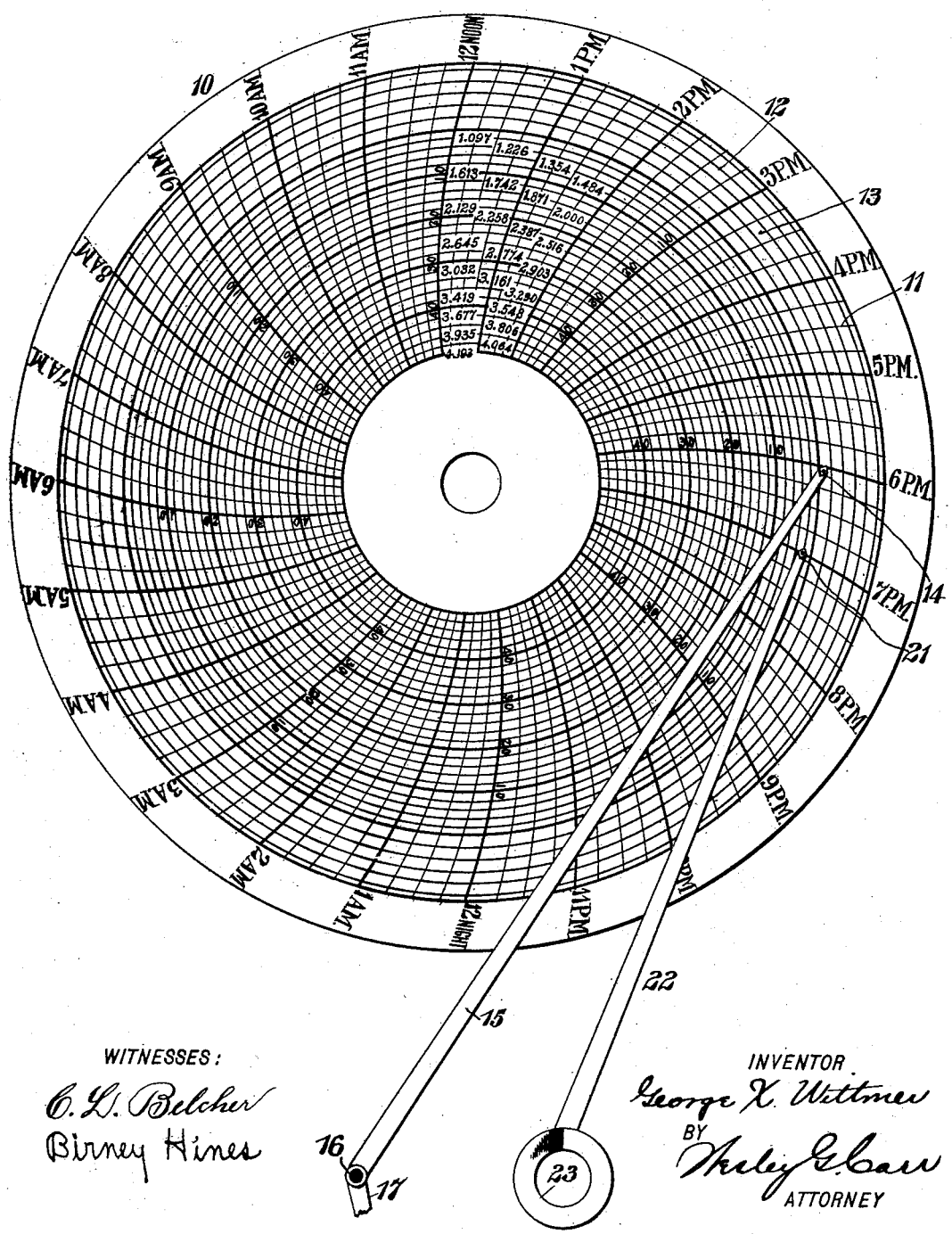

Figure 1 is a view, partially in front elevation and partially in section, of a gas-meter provided with my invention. Fig. 2 is a view, partially in side elevation and partially in section, of the apparatus shown in Fig. 1. Fig. 3 is a detail view of a portion of the means shown in Figs. 1 and 2 for recording the volume of measured gas. Fig. 4 is an enlarged front elevation of the scale or chart and stylus-arms shown in Fig. 1.

Inasmuch as the pressure of gas supplied to consumers is subject to considerable variations from time to time and the volume of gas used also varies during any given period of service, it is often desirable to have a record of the amount of gas supplied to the consumer at various intervals of time during the operation of the meter and also to have a record of variations in gas-pressure at such intervals. Since the number of heat and light units is largely dependent upon the density of the gas, it is also desirable to have some means of readily determining the volume of fluid corresponding to some given constant pressure.

My present invention provides a simple and efficient means for securing the above-mentioned results, and such means will be now described with reference to the accompanying drawings.

The casing 1 of the meter is supplied with gas through a pipe 2 and contains the measuring devices. These may be of any known construction adapted to the purpose, and hence I have deemed it unnecessary to illustrate the same.

The meter to which my invention is applied may be either one through which the entire volume of gas flows or it may be the tally member of a proportional meter, as will be readily understood.

The movable member of the measuring apparatus (not shown) is connected by means of suitable gearing 3 to a registering-train 4 in the usual manner in order that the total volume of gas passing through the meter may be registered by suitable dials and pointers 5 in accordance with the usual practice.

Mounted on the top of the meter-casing is a casing or frame 6, the back plate 7 of which is provided with clock mechanism 8, which operates to rotate a plate 9, upon which is mounted a scale or chart 10, having transverse lines 11, corresponding to time intervals, and concentric circumferential lines 12, corresponding to different gas-pressures. Outside the space which is subdivided by the lines 12 is a space 13, upon which is recorded the successive volumes of gas passing through and measured by the meter. The record within this annular space 13 is made by a suitable stylus or marking-point 14, mounted upon the free end of an arm 15, the other end of which is rigidly connected to a shaft 16, that is mounted in suitable bearings in the frame or casing 6. This arm and its stylus receive motion through an arm 17, one end of which is also rigidly connected to the shaft 16 and the other end of which is provided with a slot 18, in which operates a pin 19 of a crank 20, the latter being rigidly connected to one of the shafts or spindles of the registering-train 4 of the meter. The arms 15 and 17 and the crank 20 are so proportioned that a complete revolution of the crank will move the stylus 14 through the entire width of the spaces 13. It will be seen, therefore, that since the scale or chart 10 rotates at a uniform speed the number of complete movements of the stylus across the space 10 within a given interval of time, as indicated by the transverse lines 11, will show the volume of gas passing through the meter for each division of time during which it is in operation, the substitution of a new scale or chart for the one upon which a record has been made being required upon the completion of each twenty-four-hour period. The record of pressure of gas is made by a stylus or marking-point 21, carried by the free end of the arm 22, the other end of the arm being rigidly attached to one end of a helical tube 23, mounted in the frame or casing 6 and having an open end which projects into the space 24, which communicates with the dial 25 of the meter. It will be understood that the tube 23 may be of different form from that shown, if desired, and that if properly proportioned and of suitable material it will be actuated by the varying pressures of the gas passing through the meter to move the stylus over that portion of the chart or scale which is provided with the circumferential lines indicating pressures. As shown in Fig. 1, the stylus is at its outermost or zero position, and any pressure of gas to which the helical tube is subjected will move the stylus inward toward the center of the scale or chart. In order to enable the user of the instrument to readily determine the volume of gas corresponding to a given constant pressure, I provide each circumferential line 12 with a multiplier corresponding to the pressure indicated by that line. As shown in Fig. 4, the multipliers are so determined and selected as to correspond to the constant pressure of eight ounces, and the lines represent differences of two pounds in pressure. The scale may obviously be modified so as to provide a more exact record—as, for example, for pounds or half-pounds—and also a set of multipliers corresponding to a different constant pressure, if desired, the scale here shown being merely illustrative and not in any way restrictive as regards the pressures and volumes to be measured and recorded.

By employing the means here shown it is obviously possible to have a complete and accurate record of the actual volume of gas passing through the meter, the various pressures, and also the volumes corresponding to a given constant pressure, the latter being anything desired provided it is determined in advance and the proper multipliers employed with reference thereto, these several values being recorded for each interval of time during the twenty-four hours for which the record-scale is graduated.

I claim as my invention—

1. A scale for recording fluid-pressures having a series of concentric lines corresponding to different pressures and a series of multipliers the products of which by the corresponding pressures will give the volumes at a single predetermined pressure.

2. A scale for recording fluid-pressures having a series of concentric, circumferential lines representing different pressures, a series of transverse lines representing divisions of time and a series of multipliers the products of which by the corresponding pressures will give the volumes at a given constant pressure.

3. The combination with a fluid-meter and a uniformly-moving scale, of a recording-stylus, means for actuating the same in accordance with the pressure of the measured fluid, a registering-train operating in accordance with the volume of said fluid and a second stylus connected to said train and operated thereby to record the volume of the measured fluid, both of the records being made upon said scale.

4. The combination with a fluid-meter and a uniformly-rotating scale, of mechanism operating to register the volume of fluid passing through the meter and a stylus connected to said registering mechanism and serving to record the volume of fluid passing through the meter at each interval of time indicated on the recording-scale.

5. The combination with a fluid-meter, a rotary scale and clock mechanism for rotating the same, of mechanism for registering the total volume of fluid passing through the meter, and a stylus connected to the registering mechanism and actuated thereby to record upon the scale the volume of measured fluid at each interval of time represented thereon.

6. The combination with a fluid-meter, a scale or chart and clock mechanism for operating the same, of two recording devices and means for respectively actuating said devices in accordance with the pressure and with the volume of fluid passing through the meter to record the pressure and the volume of the measured fluid upon said scale or chart.

7. The combination with a fluid-meter and a uniformly-rotating scale or chart having time and pressure divisions and multipliers the products of which by the corresponding pressures will give the volumes at a given constant pressure, of a stylus for recording the volume and a stylus for recording the pressure of the fluid passing through the meter at each instant during its operation.

8. The combination with a fluid-meter and mechanism for registering the total volume of fluid passing through the meter, of a movable stylus the movement of which corresponds to variations in the pressure of the measured fluid, a stylus that moves with the volume-measuring mechanism and a uniformly-rotating scale or chart a different portion of which is engaged by each stylus and having scale-divisions corresponding both to time intervals and to fluid-pressures.

In testimony whereof I have hereunto subscribed my name this 4th day of March, 1902.

GEO. X. WITTMER.

Witnesses:
ROSCOE H. SMITH,
ELMER A. SMITH.